No. 707,042. Patented Aug. 12, 1902.
C. H. WHEELER & L. L. PRATT.
WATER COOLING TOWER.
(Application filed Jan. 16, 1902.)

(No Model.) 2 Sheets—Sheet 1.

No. 707,042. Patented Aug. 12, 1902.
C. H. WHEELER & L. L. PRATT.
WATER COOLING TOWER.
(Application filed Jan. 16, 1902.)

(No Model.) 2 Sheets—Sheet 2.

Witnesses Inventors

UNITED STATES PATENT OFFICE.

CLIFTON H. WHEELER AND LOUIS L. PRATT, OF SHORTHILLS, NEW JERSEY, ASSIGNORS TO WHEELER CONDENSER AND ENGINEERING COMPANY, OF NEW YORK, N. Y., A CORPORATION OF NEW JERSEY.

WATER-COOLING TOWER.

SPECIFICATION forming part of Letters Patent No. 707,042, dated August 12, 1902.

Application filed January 16, 1902. Serial No. 89,963. (No model.)

*To all whom it may concern:*

Be it known that we, CLIFTON H. WHEELER and LOUIS L. PRATT, citizens of the United States, residing at Shorthills, in the county of Essex and State of New Jersey, have invented an Improvement in Water-Cooling Towers, of which the following is a specification.

Our invention relates to cooling-towers, especially to water-cooling towers used in connection with steam plants operating with a condensing system, and more particularly to the open or non-inclosed type of this class of tower.

The object of our invention is to produce a more efficient arrangement of mats and means for distributing the circulating water, whereby greater economy is effected in the use of the apparatus.

In carrying out our invention we employ series of independent vertically-placed mats arranged at right angles to each other and with intervening spaces and means for independently distributing the circulating liquid to the mats of each series. Beneath these series of mats there is a tank or reservoir, preferably having a flaring top. The frame of the tower is suitably braced and is supported by the walls of the tank or reservoir. We provide troughs secured in the upper part of the tower-frame and arranged in series, the troughs of one series being parallel to each other and the troughs of the other series being also parallel to each other and intermediate and at right angles to the aforesaid series of troughs. Distribution-pipes extend from the outside of said troughs to the frame, and mats of wire mesh are suspended from the distribution-pipes and extend therefrom to practically the top of the reservoir.

We provide means for distributing the circulating water to the several troughs independently, and the series of mats are so arranged that there are intervening and central spaces between the series, the central space preferably containing a vertical discharge-pipe and being itself divided by vertical partitions or baffles.

Figure 2:
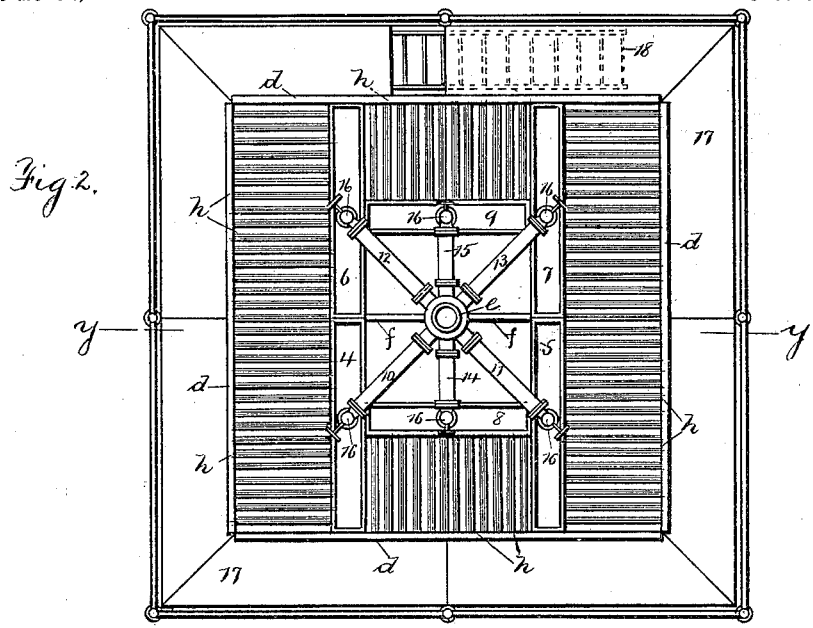
Figure 1:
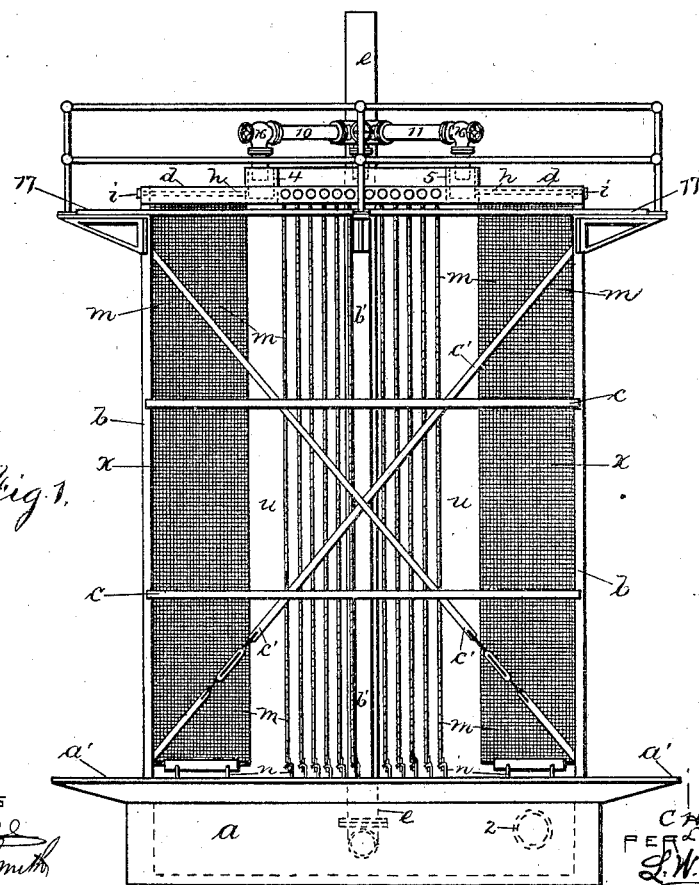
Figure 3:
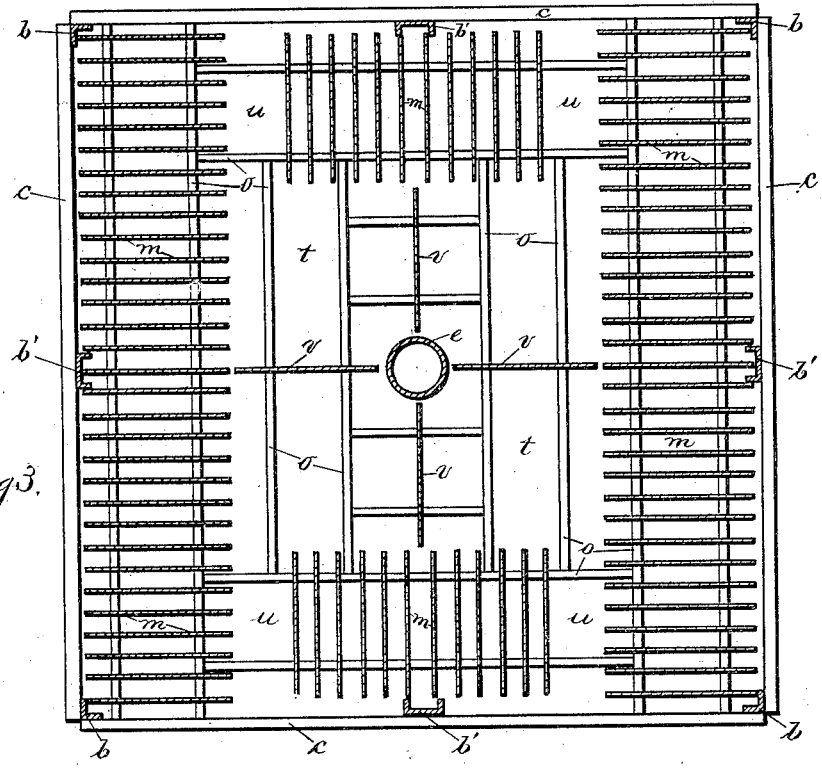
Figure 4:
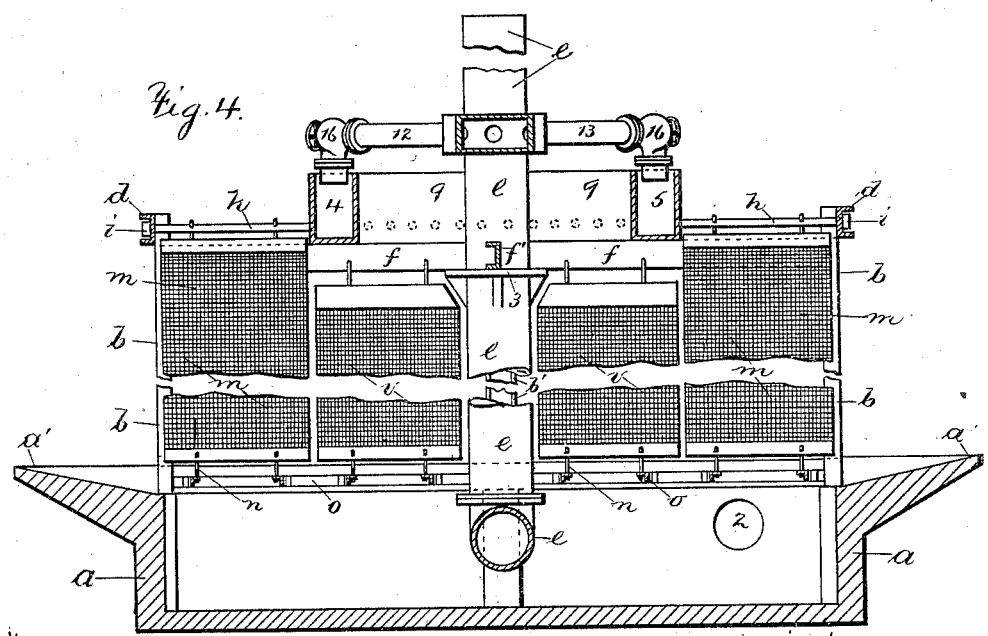

In the drawings, Figure 1 is a general elevation of our improved water-cooling tower, and Fig. 2 is a plan of the same. Fig. 3 is an enlarged sectional plan on line $xx$, Fig. 1. Fig. 4 is a partial vertical section on line $yy$, Fig. 2.

In the drawings, $a$ represents the walls of a reservoir conveniently made of brick or other suitable material and having a flaring upper edge $a'$.

$b\ b'$ represent the tower-frame uprights, the uprights $b$ at the corners being preferably angle-irons and the uprights $b'$ at the sides being channel-irons. These uprights are suitably braced by stringers $c$ and the rods $c'$. Extending around the upper ends of the said uprights $b\ b'$ we employ a series of channel-irons $d$.

The reservoir is provided with a suction-pipe 2, and a discharge-pipe $e$ extends vertically through the center of the tower and is provided at a suitable height with a bracket 3, and channel-irons $f\ f'$, having one end resting upon the bracket 3, extend therefrom to the central side upright channels $b'$, to which the other ends of the channels $f\ f'$ are secured.

4, 5, 6, and 7 represent independent troughs in pairs, the pair 4 6 being parallel to the pair 5 7, both pairs extending between the channel-irons $d$, to which the outer ends of said pairs of troughs are secured, while the central portions of said troughs rest upon the channels $f$.

8 9 represent troughs also independent and parallel to each other and intermediate and at right angles, respectively, to troughs 4 5 and 6 7. These troughs 8 9 have their ends secured to the sides of the troughs 4 5 and 6 7, while the central portions of said troughs 8 and 9 rest upon the channels $f'$. The outer sides of the troughs are provided with equidistant spaced-apart holes, and the channel-irons $d$ are also provided with holes corresponding in number and position with the holes in the said troughs.

Distribution-pipes $h$ are employed, having their ends, respectively, in the holes in the troughs and in the channel-irons $d$, and the outer ends of the distribution-pipes are provided with washers and caps $i$, and said distribution-pipes are provided with slots and holes for discharging the water.

Mats $m$, preferably of wire mesh, are suspended from the distribution-pipes $h$ and are drawn taut in a vertical position and held so by rods $n$ and a system of angle-irons $o$, extending across the bottom of the tower above the reservoir. The respective ends of the mats are preferably strengthened by plates of sheet metal. The mats are hung from the distribution-pipes by suitable hooks and are secured to the angle-iron $o$ and drawn taut by said hooked rods $n$, as particularly shown and described in Letters Patent No. 677,750, granted July 2, 1901, to the Wheeler Condenser and Engineering Company, and therefore form no part of our present invention.

The discharge-pipe $e$ is fitted above the troughs with branch pipes 10, 11, 12, 13, 14, and 15, provided with valves 16 and leading, respectively, to the several troughs 4, 5, 6, 7, 8, and 9, whereby all the troughs and their series of mats or any one or any combination of the troughs and their mats may be used absolutely irrespective of the other trough or troughs. By this arrangement of mats there is a central open space $t$ in the tower, and there are passages $u$ between the respective series of mats at right angles to one another, leading from the outside to the said central space. While the respective mats of the several series are closely adjacent to one another, the spaces between the respective groups or series of mats are considerably greater than the spaces between the respective mats of any one series, so as to permit of the unobstructed entrance of currents of air into the central space. We prefer to divide this central space into sections by employing baffles or air-current retarders $v$. These baffles $v$ are preferably made of the same wire mesh as the mats and are suspended from the channel-irons $f\ f\ f'\ f'$ and held in a taut vertical position in the same manner as the mats, the object of the said baffles being to break up and prevent strong air-currents from passing through the tower and blowing the water from the mats on the leeward side of the tower, the baffles also tending to cause an upward current of air in the center of the tower.

The tower may be provided with a gallery 17 as a means of easy access for operating the valves 16 and a ladder 18 for reaching the gallery.

With our improvement in water-cooling towers of the open type it is possible to utilize air-currents of moderation or force from any direction to their fullest extent without any necessary action on the part of an attendant, and the arrangement of the parts is such that the air-currents passing through between the mats of any series are automatically diverted and pass through between the mats of the adjacent series at right angles thereto, whereby a greater surface is acted upon and greater utility effected and increased results obtained.

We claim as our invention—

1. In a cooling-tower of the open type, the combination with a reservoir, suction and discharge pipes, of independent series of vertically-placed mats arranged at right angles to each other and with intervening spaces between said series at right angles to each other, and means for independently distributing the circulating liquid to the mats of each series, substantially as specified.

2. In a cooling-tower of the open type, the combination with a reservoir, suction and discharge pipes, of independent series of vertically-placed mats arranged at right angles to each other and with intervening spaces between said series at right angles to each other, means for independently distributing the circulating liquid to the mats of each series, and means for holding the mats taut and vertical, substantially as set forth.

3. In a cooling-tower of the open type, the combination with a reservoir, suction and discharge pipes, of long parallel series of independent vertically-placed mats in corresponding vertical planes, two short intermediate series of independent vertically-placed mats in corresponding vertical planes and at right angles to the aforesaid series with intervening and central spaces between said independent series of mats at right angles to each other, and means for independently distributing the circulating liquid to the said series of mats, substantially as specified.

4. In a cooling-tower of the open type, the combination with a reservoir, suction and discharge pipes, of long parallel series of independent vertically-placed mats in corresponding vertical planes, two short intermediate series of independent vertically-placed mats in corresponding vertical planes and at right angles to the aforesaid series with intervening and central spaces between said independent series of mats at right angles to each other, means for independently distributing the circulating liquid to the said series of mats, and means for holding the mats taut and vertical, substantially as set forth.

5. In a cooling-tower of the open type, the combination with a reservoir, suction and discharge pipes, of an open frame, mats placed in independent series, the said series being at right angles to each other, means for distributing the circulating liquid to any and all of the said independent series of mats, and means for holding the said mats taut and vertical, substantially as set forth.

6. In a water-cooling tower of the open type, the combination with a reservoir, suction and discharge pipes, of a frame, independent troughs at right angles to each other and means for supporting the same in said frame, mats arranged in independent series, the said series being at right angles to each other, and independent means for conveying the circulating water from the said discharge-pipe to the respective troughs and therefrom to the mats of the independent series, substantially as specified.

7. In a water-cooling tower the combination with a reservoir, suction and discharge pipes, of a frame, independent troughs at right angles to each other and means for supporting the same in said frame, mats arranged in independent series, the said series being at right angles to each other, independent means for conveying the circulating water from the said discharge-pipe to the respective troughs and therefrom to the mats of the independent series, radial baffles at right angles to each other and adjacent to the said discharge-pipe and dividing the spaces within the said series of mats, substantially as specified.

8. In a water-cooling tower of the open type, the combination with a reservoir, suction and discharge pipes, of a frame, independent troughs at right angles to each other and means for supporting the same in said frame, mats arranged in independent series, the said series being at right angles to each other, independent means for conveying the circulating water from the said discharge-pipe to the respective troughs and therefrom to the mats of the independent series, distribution-pipes extending between the said troughs and frame and from which the said mats are suspended, and pipes having valves therein connecting the discharge-pipe with the several independent troughs, substantially as specified.

9. In a water-cooling tower of the open type, the combination with a reservoir, suction and discharge pipes, of an open frame, a pair of independent troughs axially in line with one another, a similar pair of troughs parallel to and spaced apart from the said pair of troughs, a pair of independent troughs spaced apart, between and at right angles to the aforesaid pairs of troughs, all the troughs being secured in said frame, distribution-pipes extending from said troughs, independent series of mats suspended from said distribution-pipes, and means for conveying the circulating water from the discharge-pipe independently to each of said troughs, substantially as specified.

10. In a water-cooling tower, the combination with a reservoir, a suction-pipe and a central discharge-pipe, of an open frame, a pair of independent troughs axially in line with one another, a similar pair of troughs parallel to and spaced apart from the said pair of troughs, a pair of independent troughs spaced apart, between and at right angles to the aforesaid pairs of troughs, distribution-pipes extending outwardly from said troughs, independent series of mats suspended from said distribution-pipes, there being spaces left between the respective series of mats which are at right angles to one another, baffle-plates adjacent to the discharge-pipe extending radially from the same and at right angles to one another, and means for distributing the circulating water from the discharge-pipe independently to said troughs, substantially as specified.

Signed by us this 11th day of January, 1902.

CLIFTON H. WHEELER.
LOUIS L. PRATT.

Witnesses:
GEO. T. PINCKNEY,
W. R. WILSON.